United States Patent [19]

Fox

[11] Patent Number: 5,557,615

[45] Date of Patent: Sep. 17, 1996

[54] METHOD AND APPARATUS FOR IDENTIFYING EMBEDDED FRAMING BITS

[75] Inventor: Mark T. Fox, Austin, Tex.

[73] Assignee: Motorola Inc., Schaumburg, Ill.

[21] Appl. No.: 368,284

[22] Filed: Jan. 3, 1995

[51] Int. Cl.[6] ..................................................... H04L 7/08
[52] U.S. Cl. ..................... 370/105.1; 370/105.4; 375/368
[58] Field of Search ................................ 375/354, 362, 375/365, 366, 368; 370/100.1, 105.1, 105.4, 106, 108

[56] References Cited

U.S. PATENT DOCUMENTS

| | | | |
|---|---|---|---|
| 4,730,346 | 3/1988 | Jiang | 375/368 |
| 5,010,559 | 4/1991 | O'Connor et al. | 375/360 |
| 5,204,883 | 4/1993 | Blanc | 375/368 |

Primary Examiner—Benedict V. Safourek
Attorney, Agent, or Firm—Bruce E. Hayden

[57] ABSTRACT

A method and apparatus for identifying framing bits embedded in an ATM frame significantly improves performance by logically comparing multiple bit slices in parallel to identify framing bits. Bits are received from a sequential input stream (64) to form an ordered collection of bits, included (66) in a frame bit history. The remainder of the bits separating framing bits are ignored (68). A second group of bits is received (70) to form another ordered collection of bits of the same size. This ordered collection of bits is included (74) in the frame bit history. Bits in the sequential input stream are again ignored (80). A third group of bits is received (82) to form another ordered collection of bits, and is included (88) in the frame bit history. The various ordered collections of bits saved in the frame bit history are logically compared (90) to determine (92) whether any of the corresponding bit slices could possibly constitute framing bits.

21 Claims, 4 Drawing Sheets

METHOD AND APPARATUS FOR IDENTIFYING EMBEDDED FRAMING BITS

FIELD OF THE INVENTION

The present invention generally relates to data communications, and more specifically to a method and apparatus for identifying embedded framing bits.

BACKGROUND OF THE INVENTION

There are two major types of low level protocols used for data communications: asynchronous and synchronous. Asynchronous communications synchronizes on the byte level: each byte transmitted has one or more start and stop bits. The asynchronous protocol is useful at slower speeds, but there is a performance penalty in using start and stop bits for each byte transmitted. Higher speed transmissions generally use synchronous or block oriented communication protocols. Known synchronous protocols require that transmissions be synchronized at the block level instead of at the byte level. As blocks may be thousands of bytes long, the overhead of synchronization bits or bytes in synchronous transmissions is overcome by the overhead of start and stop bits in asynchronous transmissions.

Synchronous data communications initially used "sync" bytes at the beginning of a message to synchronize modems. At least a couple of valid sync bytes would have to be received correctly before the line was considered to be in "sync". A data block would then be delimited by start of text and end of text bytes. "Sync" would then have to be reacquired for the next block received.

The technique of using sync bytes was followed by the use of "bit stuffing" protocols like HDLC and SDLC where a sync flag (Hex "6E" or Binary "01111110") was reserved for synchronization. These protocols got their ("bit stuffing") name because every time that five "one" data bits were transmitted, a single "zero" bit was inserted in the output stream. The sync flag was also used to separate data blocks. The quality of data communications facilities had advanced by this time so that it was no longer necessary to actually resynchronize each block—rather a data block could follow another data block separated by a single sync flag.

A recent addition to the synchronous data communication protocols is Asynchronous Transfer Mode (ATM). It is a layered protocol operating at approximately 45 Mhz. The ATM DS3 Transmission System Sublayer (TSS) contains line synchronization. An ATM DS3 TSS frame consists of 4760 consecutive sequential bits, with 56 overhead bits intermixed in 4704 payload bits. Half of the overhead bits are framing bits, used for synchronization. Thus, there is a framing bit every 170 bits in the sequential input stream. Note that a 4760 bit block follows another 4760 bit block—without anything intervening in the sequential input stream.

Frame lock or synchronization is often a two step process when receiving ATM TSS frames. First the frame bits within a sequential input data stream are identified. A repeating sequence of "1001" (Binary) must be found in the framing bits. The framing bit location is usually confirmed by requiring that the "1001" sequence be found repeated a certain number of times in the sequential input stream, since such a sequence could occur naturally in the payload portion of a frame. As there are 28 framing bits within an ATM TSS block, there can be seven different possible block starting points once a repeating "1001" sequence is identified in the framing bits. So, the second step is to determine which one of the seven possible starting points is correct. This second step is done by looking at some of the other 28 overhead bits in a sequential input stream.

One method of identifying framing bits within an ATM sequential input data stream has been to test a bit from the sequential input stream. If that bit is possibly a framing bit, 169 bits from the sequential input stream are skipped, and the 171st bit is checked. If this bit is possibly a framing bit, another 169 bits are skipped, and the 341st bit is checked. This search is repeated until either a bit fails the framing bit test, or a sufficient number of bits have been tested to assure that the sequence detected indeed contains framing bits. Otherwise, the cycle is restarted. Note that it may be necessary to restart the cycle upwards of 680 times before successfully identifying the framing bits in a sequential input stream. The major disadvantage of this method is that it can take quite a long time to identify the framing bits in a sequential input stream.

One improvement to the above method has been to store upwards of a 4760 bit block in RAM. Then a search is made of the bits stored. For example, the first bit in storage is tested. If it is a one ("1") bit, 169 bits are skipped, and the 171st bit is tested. If the 171st bit is a zero ("0") bit, another 169 bits are skipped, and the 341st bit is tested for also being a zero ("0") bit. This search is repeated until either the entire block read into RAM has been successfully searched and tested, or a bit fails testing. In that case, the test is restarted for the next bit in RAM. For example, the second time around, the 2nd, 172nd, 342nd, etc. bits would be tested. This loop may have to be repeated up to 680 times before identifying the framing bits in the sequential input stream (the mean is 340 times).

The above know method has two major disadvantages: it is slow, and it requires upwards of 4760 bits of RAM. Neither of these disadvantages is fatal if implemented on a stand-alone chip with today's technology. However, both are of major concern if implemented on an integrated chip. The speed is especially critical given the high speed (45 Mhz) of the input stream.

SUMMARY OF THE INVENTION

In accordance with the invention, there is provided a method and apparatus for locating and identifying framing bits within an ATM protocol sequential input data stream that tests multiple bits from the input data stream in parallel.

A first specified number of bits from the sequential input stream are collected into a first ordered sequential collection of bits in a storage device. The ordered sequential collection of bits just collected is included in a history of sequentially collected bits. A second specified number of bits is ignored in the sequential input stream. The first specified number of bits is collected from the sequential input stream into a second ordered sequential collection of bits. The second ordered sequential collection of bits just collected is logically compared with the history of sequentially collected bits. The second ordered sequential collection of bits is included in the history of sequentially collected bits. All except the first two steps are repeated until either none of the bits in the just collected ordered sequential collection of bits when logically combined with the predetermined corresponding bits in the history of sequentially collected bits is able to constitute a proper framing code sequence, or a sum of a total count of collected bits and a total count of ignored bits is greater than or equal to a third specified number of bits.

These and other features, and advantages, will be more clearly understood from the following detailed description taken in conjunction with the accompanying drawings. It is important to point out that there may be other embodiments of the present invention which are not specifically illustrated.

DETAILED DESCRIPTION OF A PREFERRED EMBODIMENT

Figure 1:
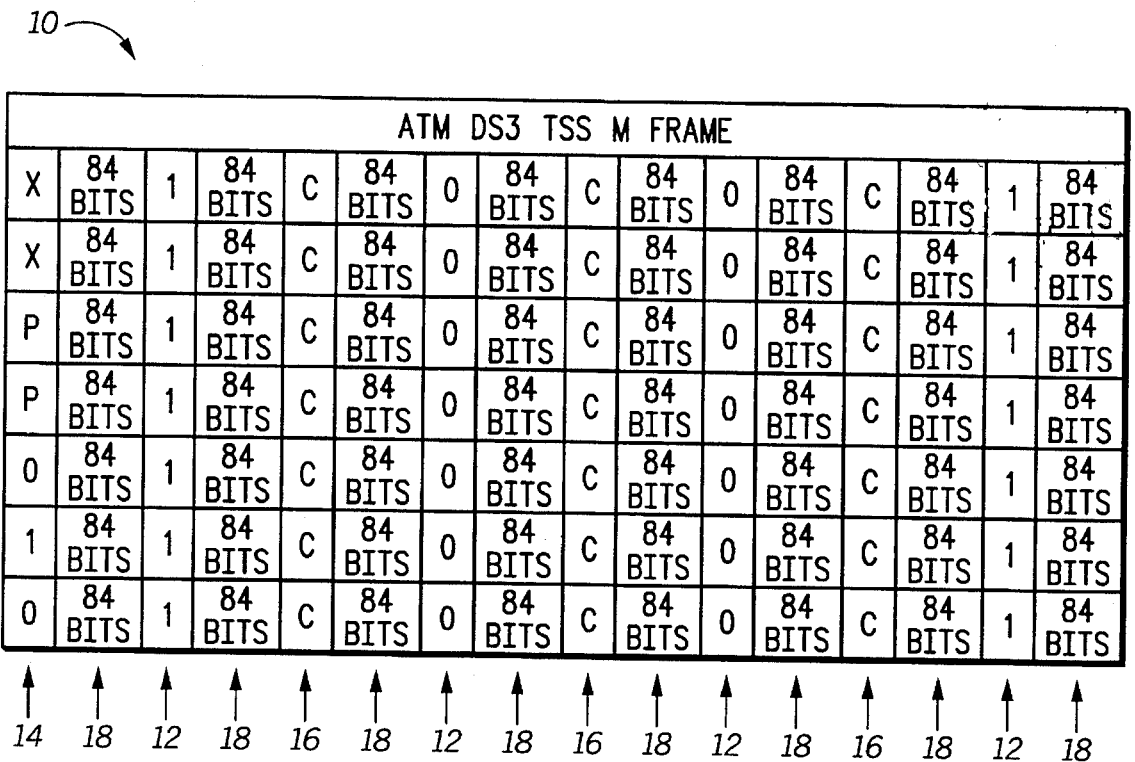
FIG. 1 is a table illustrating the relevant portions of an ATM DS3 TSS level frame.

FIG. 1 is a table showing the 4760 bits in an Asynchronous Transfer Mode (ATM) DS3 Transmission System Sublayer (TSS) frame 10. Each such TSS frame consists of 4704 data bits 18 and 56 overhead bits, with the overhead bits interspersed between every 84 data bits 18. There are three major types of overhead bits: framing bits 12, "X"/"P" bits 14, and "C" bits 16. The framing bits 12 follow a repeating binary sequence of "1001", "1001", "1001".

ATM TSS level frames 10 follow each other in a data stream without any separation. Indeed, the ATM protocol requires that idle frames be sent whenever there are no actual data frames to send.

Before the data in ATM frames can be used, it is necessary to identify TSS level frames 10 within a sequential input bit stream. Often identification of TSS level frames 10 is done in multiple steps. The first step is to identify which of the bits in the sequential input stream of bits are framing bits 12. This first step is done by finding a repeating sequence of "1001" bits with each bit in the sequence separated by 170 bits in the sequential input bit stream. As such a sequence could arise naturally in ATM data, identification of the framing bits 12 is usually not declared successful until a specified number of sequential "1001" bit sequences have been encountered in the sequential input bit stream. A requirement for seven (7) such sequences (equivalent to an entire ATM TSS level frame 10) appears to yield acceptable results.

As there are seven "1001" framing bit 12 sequences in a TSS level frame 10, once framing bits 12 have been identified, there remain seven possible starting locations for a TSS level frame 10 in the sequential input bit stream. The second step then is to determine which of the seven possible starting locations is correct. This can be done using the contents of the other overhead bits 14, 16, which can now be easily located relative to the identified location of the framing bits 12 in the sequential input bit stream.

This invention utilizes fewer cycles, and achieves identification of framing bits more quickly, as compared to the prior art, by searching for framing bits 12 in parallel. This is done by storing an ordered collection of bits having a specified number of sequential bits received from the sequential input stream of bits into a memory such as a register or a variable. The number of bits received and stored can be a multiple of 8 to allow for the more efficient use of byte and word instructions. A specified number of bits is then skipped or ignored, the number of bits skipped or ignored being the difference between the number of sequential bits in the stored ordered collection of bits, and the number of bits (170) separating framing bits 12 in a TSS level frame 10. A second ordered collection of bits is then received or read from the sequential input bit stream and is similarly stored in a memory, such as a second register. The two ordered collections of bits are logically compared on a bit by bit basis to determine whether any pairs of corresponding bits could constitute framing bits. Corresponding bits in the ordered collections of bits can be seen to form logical bit slices. This skipping, receiving, and comparing is repeated until either 28 repetitions (equal to one entire TSS frame 10) have been evaluated, or none of the corresponding bit slices could possibly constitute a legitimate framing bit sequence.

Figure 2:
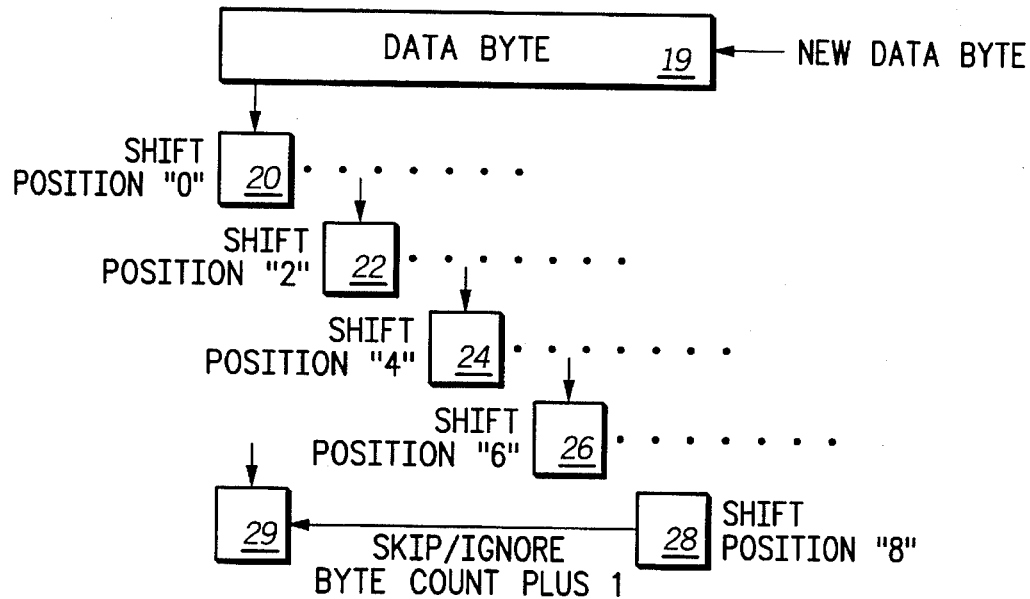
FIG. 2 is a chart illustrating in accordance with the present invention a method of compensating for non-byte alignment of framing bits.

One complication that arises in the implementation of this method of identifying framing bits on actual hardware is that the number of bits between framing bits (170) is not an even multiple of the standard computer byte size (8). One solution to this complication is shown in FIG. 2 where data bytes 19 are received from the sequential input stream. If are the first bytes received, they are left unshifted 20. The bytes containing the second ordered collection of bits are shifted left or offset two bits 22. Likewise, the bytes containing the third ordered collection are left shifted or offset four bits 24, and the bytes containing the fourth collection are shifted left or offset six bits 26. The bytes containing the fifth ordered collection of bits 28 are not left shifted or offset 29, but rather an extra byte is ignored or skipped the next time through the loop. The sequence is repeated until either 28 ordered collections of bits have been tested, or none of the bit slices could constitute a legal framing sequence. Note that left shifting here by a specified number of bits is logically equivalent to right shifting by the number of bits in a byte (8) minus the number of bits left shifted. In a preferred implementation, the present invention would be implemented as custom circuitry using commonly available design tools instead of a general purpose processor. In such a case, actual shifting is not necessary, rather sixteen (16) bits can be gated out of a three byte/twenty-four (24) bit register based on the logic in FIG. 2.

The ceiling on the number of cycles as described above that must be executed to identify flag bits in an ATM TSS level frame can be computed by dividing the number of bits between framing bits (170) by the number of bits in the ordered collection of bits that are received and compared at a time in parallel. For example, in the preferred embodiment, two eight (8) bit bytes are received and compared at a time in parallel. The ceiling on the number of cycles required for identifying framing bits is then 170/16, or approximately 11 cycles.

Figure 3:
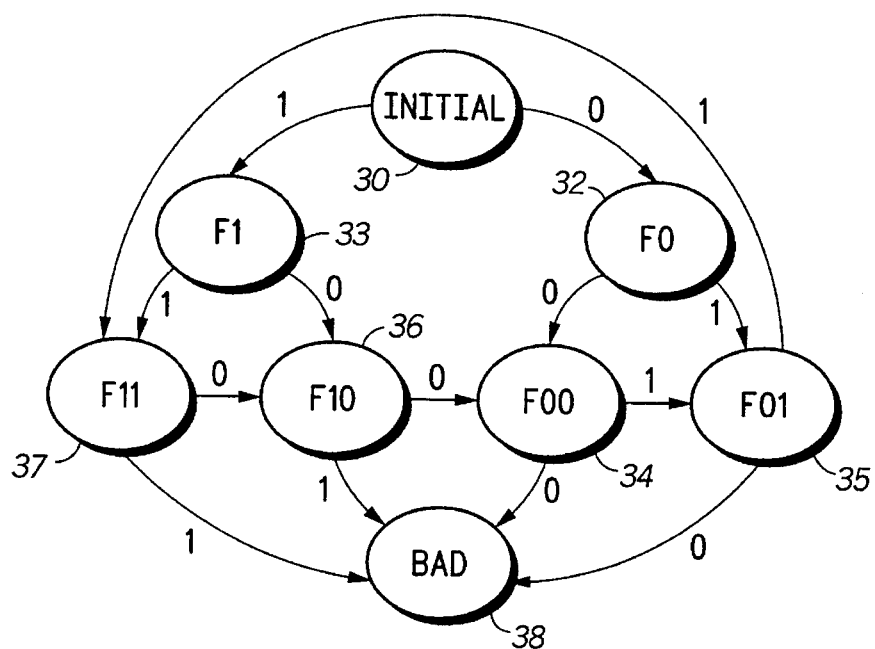
FIG. 3 is a state diagram illustrating in accordance with the present invention the states of the framing bits for a valid ATM DS3 level frame.

FIG. 3 shows a state transition diagram for use in comparing corresponding bits in parallel to determine whether framing bits have been identified. Upon starting to test for possible framing bits, each bit in parallel is considered to be in the initial state 30. If the first bit received is a zero bit, state F0 32 is entered, otherwise, state F1 33 is entered. If in state F0 32, and a zero bit is received, state F00 34 is entered, otherwise state F01 is entered 35. Otherwise if in state F1 33, and a zero bit is received, state F10 36 is entered, otherwise state F11 37 is entered.

Thereafter states F11 37, F10 36, F00 34, and F01 35 are iteratively traversed in that order as long as framing bits are received in the required repeating "1001" sequence. If any other sequence of bits is received, the Frame Bit Sequence Bad 38 state is entered for that bit slice. When all of the bits being tested in parallel enter Frame Bit Sequence Bad 38 state, none of the bit slices can constitute a valid framing sequence, and thus the entire sequence can be restarted for another cycle, with all bits reset to the initial state 30.

Figure 4:
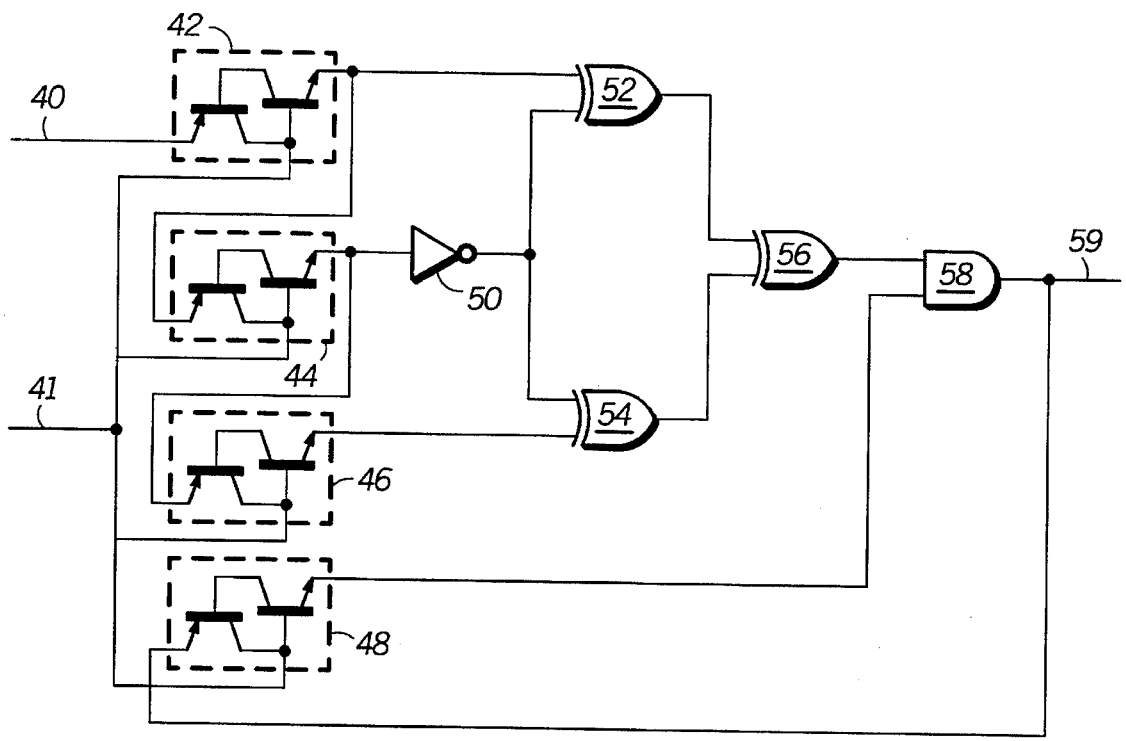
FIG. 4 is a circuit schematic illustrating one embodiment implementing the state diagram shown in FIG. 3.

FIG. 4 shows a possible implementation of the state transition diagram shown in FIG. 3 that is optimized to use only four memory devices 42, 44, 46, 48, per bit being tested in parallel. The basis of this implementation is the realization that the legal state transitions F11 37 to F10 36 to F00 34 to F01 35 and back to F11 37 (shown in FIG. 3) can be transformed to use three variables: T0, T1, and T2, corresponding to the state of the machine at the current time (T2), at the first previous time (T1), and second previous time (T2) so that the state at T1 equals the state at either T0 or T2, but not both. This can be written as:

$$V2 = ((T0 \equiv T1) \oplus (T1 \equiv T2)) \quad (1)$$

where "V2" denotes Valid at time T2, and since $$(a \equiv b)(a \oplus \overline{b}), \text{ and } (a \oplus b)(b \oplus a) \quad (2)$$

the equation can be rewritten as:

$$V2 = ((T0 \oplus \overline{T1}) \oplus (\overline{T1} \oplus T2)) \quad (3)$$

A fourth variable (Valid) can be used to remember whether or not an invalid sequence of bits has ever been received, which complemented is Frame Bit Bad state 38 as shown in FIG. 3. This results in:

$$\text{Valid} = (\text{Valid} \cdot ((T0 \oplus \overline{T1}) \oplus (\overline{T1} \oplus T2))), \text{ and } \text{FrameBitBad} = \overline{\text{Valid}} \quad (4)$$

The circuit shown in FIG. 4 has two inputs: an input line 40, carrying the state of the latest input bit received, and a clock line 41. The clock line 41 can be activated every time that the requisite number of bits in an ordered collection of bits have been received. It is used to update the memory elements in the circuit. The input line 40 is the input to the T0 latch 42. The input of the T1 latch 44 is the output of the T0 latch 42, and the input to the T2 latch 46 is the output of the T1 latch 44. The two first level Exclusive OR ("XOR") gates 52, 54, each has as one of its inputs the outputs of the T0 42, and T2 46 latches, respectively, and as its other input the complemented 50 output of the T1 latch 44. The outputs of the two first level XOR gates 52, 54, are the inputs to the second level XOR gate 56. Finally, the current state of the Valid latch 48 and the output of the second level XOR gate 56 are the inputs to an AND gate 58. The output 59 of the AND gate 58 is the input to the Valid latch 48, resulting thereafter in an output 59 of zero once the input line 40 for three consecutive bits fails to satisfy the Equation (3) relationship. Note that the above circuit may be replicated for each bit being logically compared in parallel.

Figure 5:
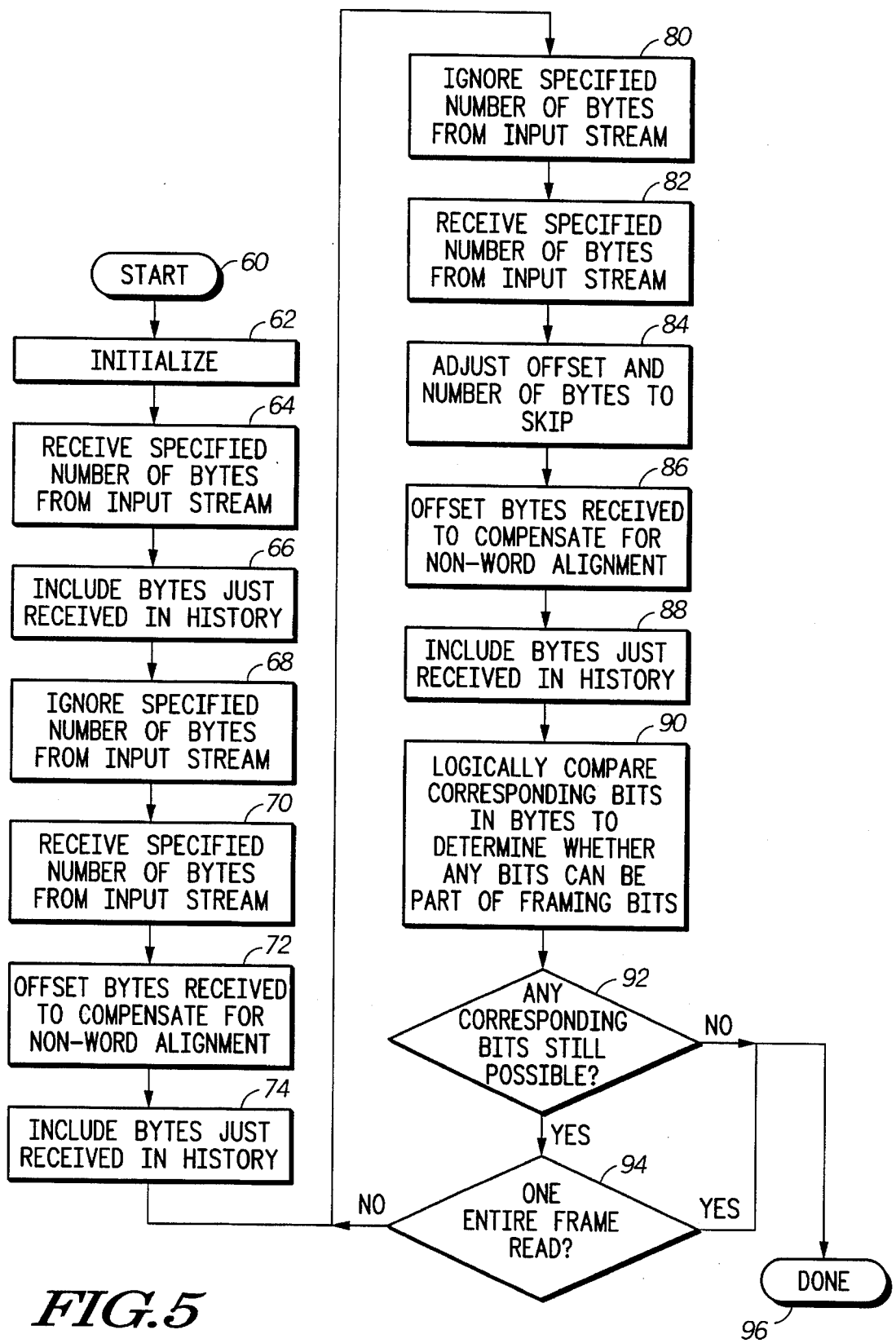
FIG. 5 illustrates in accordance with the present invention a flow chart of a method for locating framing bits by testing one or more bytes in parallel.
Figure 6:
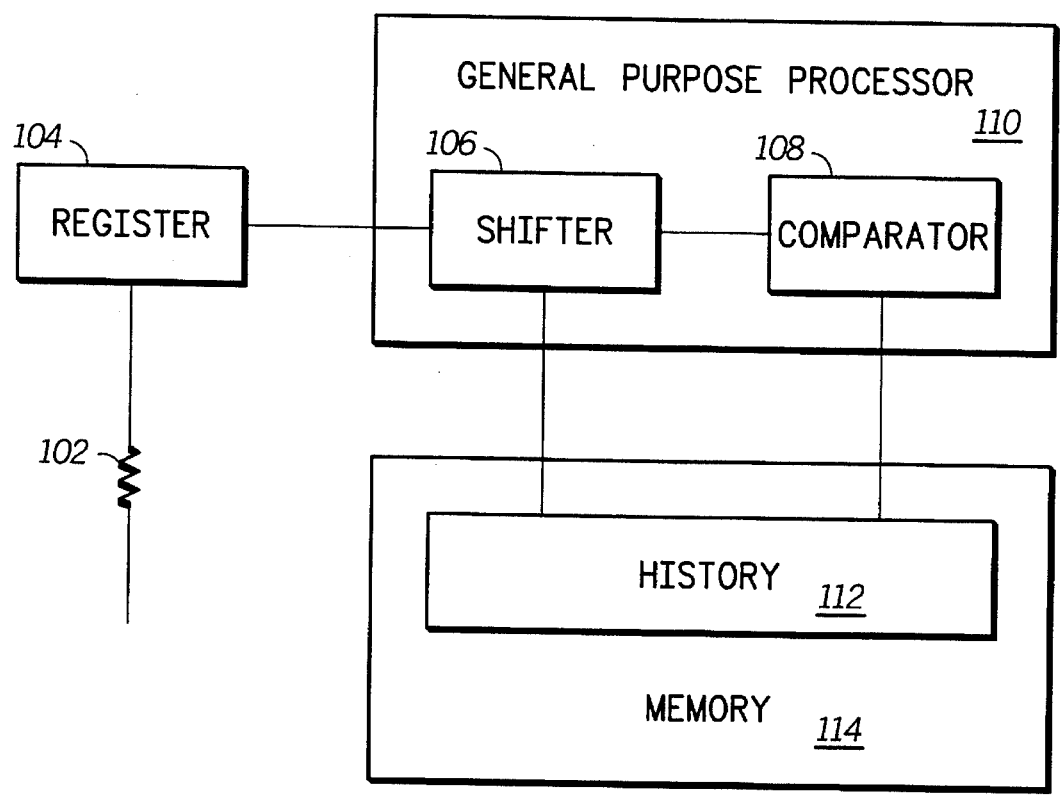
FIG. 6 is a block diagram showing a general purpose processor, in accordance with the present invention.

FIG. 5 shows a flow chart of a routine or procedure implementing the invention. After starting, step 60, the routine is initialized, step 62. A specified number of sequential bytes are received, step 64, from the sequential input bit stream 102, and are stored in memory means 104 such as a register or a variable, forming an ordered collection of bits. The number of bytes received or read, step 64, is the number of bits to be logically compared in parallel. For example, sixteen (16) bits, or two (2) eight (8) bit bytes may be read or received, and ultimately logically compared with corresponding bits found later in the input bit stream. After being received, the ordered collection of bits is included in a history 112 of possible frame bits (for example, T0 42, T1 44, and T2 46 as shown in FIG. 4) located in memory 114. A specified number of bytes from the input bit stream is then skipped or ignored, step 68. The number of bytes skipped or ignored is equal to the number of bits separating frame bits (170) in an ATM TSS frame less the number of bits (16) just read or received, step 64, the difference divided by the number of bits in a byte (8). An integral number of nineteen ((170−16)/8=19) bytes is skipped or ignored, step 68, compensating later, step 72, for the two (170−16−(8*(19))=2) excess bits.

The second time that bytes are received, step 70, or read from the input bit stream, one additional byte (3) is read or received. This is to compensate for the two bits left over after the previous skip or ignore, step 68. In order to compensate, step 72, for the non-alignment, the bytes read can be offset or right shifted six bits. For alignment purposes, this is logically equivalent to left shifting two bits 22 (see FIG. 2). The result is that these bits are then aligned with corresponding bits from the first ordered collection of bits received, step 64, from the sequential input stream. After offsetting to compensate, step 72, for non-word alignment, the shifted input bytes are included, step 74, in the history of possible frame bits.

At this point a loop is entered. First, a specified number of bytes from the input stream 102 are skipped or ignored, step 82. The number skipped or ignored, step 82, is usually one less than the number of bytes skipped or ignored, step 68, outside of the loop to compensate for receiving, steps 70, 82, one extra byte from the input stream. Next a specified number of sequential bytes are received, step 82, or read from the input stream 102. Again, one more byte (3) is read or received, step 82, than will be logically compared (2) to compensate for non-byte alignment. Before the bytes read or received, step 82, can be included, step 88, in the history 112 and logically compared 108, step 90, the bytes read or received, step 82, must be shifted or offset 106 to compensate, step 86, for non-byte alignment. This can be done by keeping a shift count, which is incremented or decremented every time through the loop by two (i.e. by the amount of non-byte alignment). However, before offsetting to compensate, step 86, for non-byte alignment, it is helpful to adjust, step 84, if necessary, the number of bytes to be skipped or ignored, step 80, the next time through the loop, and the shift count/bit offset used to compensate, step 86, for non-byte alignment (See FIG. 2). For example, if a right shift count is used to keep track of the current bit offset, when the next right shift count is eight (8), the count of bytes to skip can be incremented by one, and the right shift count reset to zero.

After shifting 106 to compensate, step 86, for non-byte alignment, the aligned bits form an ordered collection of bits that is included, step 88, in the history 112. For example, the shifted bits can be loaded on the input line 40 into the T0 42 latch, flipflop, or register (See FIG. 4). Corresponding bits in the history 112 in memory 114 are then logically compared 108, step 90, to determine whether any of the corresponding bit slices could still constitute a valid framing sequence. If none of the corresponding bit slices could still constitute a valid framing sequence, step 92, both the loop and routine or procedure terminate, step 96. At this time, the routine or procedure will presumably be restarted, step 60, again trying to identify the framing bits. Otherwise, if at least one of the bit slices could still constitute a valid framing sequence, the sum of the number of bytes received 64, 70, 82 and the number of bytes skipped or ignored, steps 68, 80, is compared, step 94, to a specified limit. In the preferred embodiment, this limit is equal to the number of bits in an ATM TSS level frame (4760). If this limit is exceeded, an entire frame has been either received or skipped, the loop is terminated, step 96, and the framing bits are considered identified. Otherwise, the loop is repeated, starting with the skipping or ignoring 80 of bytes from the sequential input stream.

By now it should be appreciated that there has been provided an improved method and apparatus for identification of embedded framing bits. Substantial performance gains are realized by receiving, storing, and logically comparing at one time ordered collections of bits sixteen (16) bits long in parallel. Storage requirements are reduced to 64 bits plus some counters. Receiving, storing, and comparing 16 bits at a time results in a ceiling of eleven (11) frames on the number of ATM TSS frames received before being able to accurately identify the framing bits. Another frame may be used to determine actual framing based on the other overhead bits in an ATM TSS frame, and a final frame used to skip or ignore enough bits to achieve final frame lock, resulting in frame lock achieved in a maximum of thirteen (13) frames.

There is an obvious tradeoff between the number of bits received, stored, and compared in parallel, and thus the amount of circuitry required if implemented in silicon, and the number of frames required for locating framing bits. When not directly implemented in circuitry, but rather using a general purpose processor 110, the method may be implemented in software. In such a case, receiving, storing, and comparing an entire 170 bit ordered collection of bits at a time may make engineering sense, resulting in location of framing bits in one cycle or frame.

Those skilled in the art will recognize that modifications and variations can be made without departing from the spirit of the invention. Therefore, it is intended that this invention encompass all such variations and modifications as fall within the scope of the appended claims.

I claim:

1. A method for identifying framing bits in frames of data bits in a sequential input stream of bits, where the framing bits are embedded among data bits in each of the frames, the method comprising the steps of:

(a) collecting in a storage device a first specified number of bits from the sequential input stream into a first ordered sequential collection of bits;
 wherein said first specified number of bits is greater than one, (b) including the first ordered sequential collection of bits just collected in a history of sequentially collected bits;

(c) ignoring a second specified number of bits in the sequential input stream;

(d) collecting in the storage device said first specified number of bits from the sequential input stream into a second ordered sequential collection of bits;

(e) logically comparing bits in the second ordered sequential collection of bits just collected to predetermined corresponding bits in the history of sequentially collected bits to determine whether any bits in the just collected second ordered collection of bits combined with predetermined corresponding bits in the history of sequentially collected bits is able to constitute a proper framing code sequence;

(f) including the second ordered sequential collection of bits just collected in a history of sequentially collected bits; and (g) repeating steps (c)–(f) until either:
  (1) none of the bits in the just collected ordered sequential collection of bits when logically combined with the predetermined corresponding bits in the history of sequentially collected bits is able to constitute a proper framing code sequence, or
  (2) a sum of a total count of collected bits and a total count of ignored bits is greater than or equal to a third specified number of bits.

2. The method for identifying framing bits as claimed in claim 1 wherein said first specified number of bits is an even multiple of 8.

3. The method for identifying framing bits as claimed in claim 2 wherein said second specified number of bits is not an even multiple of 8.

4. The method for identifying framing bits as claimed in claim 1 wherein the method is used to determine frame lock for Asynchronous Transfer Mode frames.

5. The method for identifying framing bits as claimed in claim 1 wherein:

(a) the second specified number of bits is determined by subtracting the first specified number of bits from 170, and (b) the third specified number of bits is determined by adding the first specified number of bits to 4676.

6. The method for identifying framing bits as claimed in claim 1 wherein said first specified number is 16.

7. The method for identifying framing bits as claimed in claim 1 which additionally comprises the step of receiving the sequential input stream of bits while concurrently performing at least one of steps (a) through (g).

8. An apparatus for identifying framing bits in frames of data bits in a sequential input stream of bits, where the framing bits are embedded among data bits in each of the frames, the apparatus comprising:

(a) means for collecting in a memory a first specified number of bits from the sequential input stream into a first ordered sequential collection of bits;
 wherein said first specified number of bits is greater than one, (b) means for including the first ordered sequential collection of bits just collected in a history of sequentially collected bits;

(c) means for ignoring a second specified number of bits in the sequential input stream;

(d) means for collecting in the memory said first specified number of bits from the sequential input stream into a second ordered sequential collection of bits;

(e) means for logically comparing bits in the second ordered sequential collection of bits just collected to predetermined corresponding bits in the history of sequentially collected bits to determine whether any bits in the just collected second ordered collection of bits combined with predetermined corresponding bits in the history of sequentially collected bits is able to constitute a proper framing code sequence;

(f) means for including the second ordered sequential collection of bits just collected in a history of sequentially collected bits;

(g) means for repeating steps (c)–(f) until either:
  (1) none of the bits in the just collected second ordered sequential collection of bits when logically combined with the predetermined corresponding bits in the history of sequentially collected bits is able to constitute a proper framing code sequence, or (2) a sum of a total count of collected bits and a total count of ignored bits is greater than or equal to a third specified number of bits.

9. A method for identifying framing bits in frames of sequential bits in a sequential input stream of bits, where the framing bits are embedded in a regular pattern among data bits in each of the frames of sequential bits, the method comprising the steps of:

(a) determining a first and a second specified number of bytes,
    each byte consisting of a specified number of bits in a predetermined order from said sequential input stream;

(b) ignoring said first specified number of bytes in the sequential input stream;

(c) collecting in a storage device said second specified number of bytes from the sequential input stream into an ordered sequential collection of bytes;

(d) forming an aligned collection of bits by offsetting the ordered sequential collection of bytes just collected in order to align bits in the ordered sequential collection of bytes just collected with predetermined corresponding bits in a history of sequentially collected bytes, each entry in said history of sequentially collected bytes comprising a third specified number of bytes;

(e) including the aligned collection of bits just offset in the history of sequentially collected bytes;

(f) logically comparing bits in the aligned collection of bits just offset to predetermined corresponding bits in the history of sequentially collected bytes to determine whether any bits in the just offset aligned collection of bits combined with predetermined corresponding bits in the history of sequentially collected bits is able to constitute a proper framing code sequence; and (g) repeating steps (a)–(f) until either:
    (1) none of the bits in the just offset aligned collection of bits when logically combined with the predetermined corresponding bits in the history of sequentially collected bytes is able to constitute a proper framing code sequence, or
    (2) steps (a)–(f) have been repeated a specified number of times.

10. The method for identifying framing bits as claimed in claim 9 wherein the specified number of bits in each said byte is eight.

11. The method for identifying framing bits as claimed in claim 9 wherein said third specified number of bytes is equal to two.

12. The method for identifying framing bits as claimed in claim 9 which additionally comprises the step of receiving the sequential input stream of bits while concurrently performing at least one of steps (a) through (f).

13. The method for identifying framing bits as claimed in claim 9 wherein steps (a)–(f) are repeated no more than twenty-eight times.

14. The method for identifying framing bits as claimed in claim 9 wherein the determining of the first specified number of bytes and the second specified number of bytes, and the offsetting of the ordered sequential collection of bytes comprise the following repeating sequence of steps, each following step corresponding to one repetition of steps (a)–(f) in claim 9:

(a) setting said second specified number of bytes equal to one more than said third specified number of bytes and said first specified number of bytes equal to the difference between twenty-one and said second specified number of bytes, and offsetting the ordered sequential collection of bytes by ignoring the first two bits of the first byte just collected;

(b) setting said second specified number of bytes equal to one more than said third specified number of bytes and said first specified number of bytes equal to the difference between twenty-one and said second specified number of bytes, and offsetting the ordered sequential collection of bytes by ignoring the first four bits of the first byte just collected;

(c) setting said second specified number of bytes equal to one more than said third specified number of bytes and said first specified number of bytes equal to the difference between twenty-one and said second specified number of bytes, and offsetting the ordered sequential collection of bytes by ignoring the first six bits of the first byte just collected; and (d) setting said second specified number of bytes equal to one more than said third specified number of bytes and said first specified number of bytes equal to the difference between twenty-two and said second specified number of bytes, and offsetting the ordered sequential collection of bytes by ignoring the first eight bits of the first byte just collected.

15. The method for identifying framing bits as claimed in claim 9 wherein the determining of the first specified number of bytes and the second specified number of bytes, and the offsetting of the ordered sequential collection of bytes comprise the following repeating sequence of steps, each following step corresponding to one repetition of steps (a)–(f) in claim 9:

(a) setting said second specified number of bytes equal to one more than said third specified number of bytes and said first specified number of bytes equal to the difference between twenty-one and said second specified number of bytes, and offsetting the ordered sequential collection of bytes by ignoring the first two bits of the first byte just collected;

(b) setting said second specified number of bytes equal to one more than said third specified number of bytes and said first specified number of bytes equal to the difference between twenty-one and said second specified number of bytes, and offsetting the ordered sequential collection of bytes by ignoring the first four bits of the first byte just collected;

(c) setting said second specified number of bytes equal to one more than said third specified number of bytes and said first specified number of bytes equal to the difference between twenty-one and said second specified number of bytes, and offsetting the ordered sequential collection of bytes comprises by the first six bits of the first byte just collected; and (d) setting said second specified number of bytes equal to said third specified number of bytes and said first specified number of bytes equal to the difference between twenty-one and said second specified number of bytes, and offsetting the ordered sequential collection of bytes by ignoring the first zero bits of the first byte just collected.

16. The method for identifying framing bits as claimed in claim 9 wherein the determining of the first specified number of bytes and the second specified number of bytes, and the offsetting of the ordered sequential collection of bytes comprise the following repeating sequence of steps, each following step corresponding to one repetition of steps (a)–(f) in claim 9:

(a) setting said second specified number of bytes equal to one more than said third specified number of bytes and said first specified number of bytes equal to the difference between twenty-one and said second specified number of bytes, and offsetting the ordered sequential collection of bytes by shifting each bit in said ordered collection of bytes just collected left two bits;

(b) setting said second specified number of bytes equal to one more than said third specified number of bytes and said first specified number of bytes equal to the difference between twenty-one and said second specified number of bytes, and offsetting the ordered sequential collection of bytes by shifting each bit in said ordered collection of bytes just collected left four bits;

(c) setting said second specified number of bytes equal to one more than said third specified number of bytes and said first specified number of bytes equal to the difference between twenty-one and said second specified number of bytes, and offsetting the ordered sequential collection of bytes by shifting each bit in said ordered collection of bytes just collected left six bits; and (d) setting said second specified number of bytes equal to one more than said third specified number of bytes and said first specified number of bytes equal to the difference between twenty-two and said second specified number of bytes, and offsetting the ordered sequential collection of bytes by shifting each bit in said ordered collection of bytes just collected left eight bits.

17. The method for identifying framing bits as claimed in claim 9 wherein the determining of the first specified number of bytes and the second specified number of bytes, and the offsetting of the ordered sequential collection of bytes comprise the following repeating sequence of steps, each following step corresponding to one repetition of steps (a)–(f) in claim 9:

(a) setting said second specified number of bytes equal to one more than said third specified number of bytes and said first specified number of bytes equal to the difference between twenty-one and said second specified number of bytes, and offsetting the ordered sequential collection of bytes by shifting each bit in said ordered collection of bytes just collected right six bits;

(b) setting said second specified number of bytes equal to one more than said third specified number of bytes and said first specified number of bytes equal to the difference between twenty-one and said second specified number of bytes, and offsetting the ordered sequential collection of bytes by shifting each bit in said ordered collection of bytes just collected right four bits;

(c) setting said second specified number of bytes equal to one more than said third specified number of bytes and said first specified number of bytes equal to the difference between twenty-one and said second specified number of bytes, and offsetting the ordered sequential collection of bytes comprises by shifting each bit in said ordered collection of bytes just collected right two bits; and (d) setting said second specified number of bytes equal to one more than said third specified number of bytes and said first specified number of bytes equal to the difference between twenty-two and said second specified number of bytes, and offsetting the ordered sequential collection of bytes by shifting each bit in said ordered collection of bytes just collected right eight bits.

18. A method for identifying framing bits as claimed in claim 9 wherein the determining of the first specified number of bytes and the second specified number of bytes, and the offsetting of the ordered sequential collection of bytes comprise the following repeating sequence of steps, each following step corresponding to one repetition of steps (a)–(f) in claim 9:

(a) setting said second specified number of bytes equal to one more than said third specified number of bytes and said first specified number of bytes equal to the difference between twenty-one and said second specified number of bytes, and offsetting the ordered sequential collection of bytes by shifting each bit in said ordered collection of bytes just collected right six bits;

(b) setting said second specified number of bytes equal to one more than said third specified number of bytes and said first specified number of bytes equal to the difference between twenty-one and said second specified number of bytes, and offsetting the ordered sequential collection of bytes by shifting each bit in said ordered collection of bytes just collected right four bits;

(c) setting said second specified number of bytes equal to one more than said third specified number of bytes and said first specified number of bytes equal to the difference between twenty-one and said second specified number of bytes, and offsetting the ordered sequential collection of bytes comprises by shifting each bit in said ordered collection of bytes just collected right two bits; and (d) setting said second specified number of bytes equal to said third specified number of bytes and said first specified number of bytes equal to the difference between twenty-one and said second specified number of bytes, and offsetting the ordered sequential collection of bytes by shifting each bit in said ordered collection of bytes just collected right zero bits.

19. An apparatus for identifying framing bits in frames of sequential bits in a sequential input stream of bits, where the framing bits are embedded in a regular pattern among data bits in each of the frames of sequential bits, the apparatus comprising:

(a) means for determining a first and a second specified number of bytes, each byte consisting of a specified number of bits in a predetermined order from said sequential input stream;

(b) means for ignoring said first specified number of bytes in the sequential input stream;

(c) means for collecting in a memory said second specified number of bytes from the sequential input stream into an ordered sequential collection of bytes;

(d) means for forming an aligned collection of bits by offsetting the ordered sequential collection of bytes just collected in order to align bits in the ordered sequential collection of bytes just collected with predetermined corresponding bits in a history of sequentially collected bytes, each entry in said history of sequentially collected bytes comprising a third specified number of bytes;

(e) means for including the aligned collection of bits just offset in the history of sequentially collected bytes;

(f) means for logically comparing bits in the aligned collection of bits just offset to predetermined corresponding bits in the history of sequentially collected bytes to determine whether any bits in the just offset aligned collection of bits combined with predetermined corresponding bits in the history of sequentially collected bits is able to constitute a proper framing code sequence;

(g) means for repeating steps (a)–(f) until either:

(1) none of the bits in the just offset aligned collection of bits when logically combined with the predetermined corresponding bits in the history of sequentially collected bytes is able to constitute a proper framing code sequence, or (2) steps (a)–(f) have been repeated a specified number of times.

20. A method for identifying framing bits in frames of sequential bits in a sequential input stream of bits, where the framing bits are embedded in a regular pattern among data bits in each of the frames of sequential bits, the method comprising the steps of:

(a) receiving the sequential input stream of bits;

(b) determining a first and a second specified number of bytes, each byte consisting of a eight bits in a predetermined order from said sequential input stream;

(c) ignoring said first specified number of bytes in the received sequential input stream;

(d) collecting in a storage device said second specified number of bytes from the received sequential input stream into an ordered sequential collection of bytes;

(e) forming an aligned collection of bits by offsetting the ordered sequential collection of bytes just collected in order to align bits in the ordered sequential collection of bytes just collected with predetermined corresponding bits in a history of sequentially collected bytes, wherein each entry in said history of sequentially collected bytes comprises a third specified number of bytes, and said third specified number of bytes is equal to two;

(f) including the aligned collection of bits just offset in the history of sequentially collected bytes;

(g) logically comparing bits in the aligned collection of bits just offset to predetermined corresponding bits in the history of sequentially collected bytes to determine whether any bits in the just offset aligned collection of bits combined with predetermined corresponding bits in the history of sequentially collected bits is able to constitute a proper framing code sequence; and (h) repeating steps (b)–(g) until either:

(1) none of the bits in the just offset aligned collection of bits when logically combined with the predetermined corresponding bits in the history of sequentially collected bytes is able to constitute a proper framing code sequence, or (2) steps (a)–(f) have been repeated at least twenty-eight times.

21. An apparatus for identifying framing bits in frames of data bits in a sequential input stream of bits, where the framing bits are embedded among data bits in each of the frames, the apparatus comprising:

(a) a memory;

(b) a general purpose processor programmed to collect in the memory a first specified number of bits from the sequential input stream into a first ordered sequential collection of bits, wherein said first specified number of bits is greater than one;

(c) the general purpose processor programmed to include the first ordered sequential collection of bits just collected in a history of sequentially collected bits; (d) the general purpose processor programmed to ignore a second specified number of bits in the sequential input stream;

(e) the general purpose processor programmed to collect in the memory said first specified number of bits from the sequential input stream into a second ordered sequential collection of bits;

(f) the general purpose processor programmed to logically compare bits in the second ordered sequential collection of bits just collected to predetermined corresponding bits in the history of sequentially collected bits to determine whether any bits in the just collected second ordered collection of bits combined with predetermined corresponding bits in the history of sequentially collected bits is able to constitute a proper framing code sequence;

(g) the general purpose processor programmed to include the second ordered sequential collection of bits just collected in a history of sequentially collected bits; and (h) the general purpose processor programmed to iterate through elements (d)–(g) until either:

(1) none of the bits in the just collected second ordered sequential collection of bits when logically combined with the predetermined corresponding bits in the history of sequentially collected bits is able to constitute a proper framing code sequence, or (2) a sum of a total count of collected bits and a total count of ignored bits is greater than or equal to a third specified number of bits.

* * * * *